July 9, 1940.  E. R. SCOTT  2,207,227

SUN VISOR

Filed July 11, 1938

ERNEST R. SCOTT
INVENTOR

BY Hubert Miller
ATTORNEY

Patented July 9, 1940

2,207,227

UNITED STATES PATENT OFFICE 2,207,227

SUN VISOR

Ernest R. Scott, Oklahoma City, Okla.

Application July 11, 1938, Serial No. 218,570

1 Claim. (Cl. 296—95)

This invention relates to sun visors or sunshades for automobiles.

In recent years automobile body designs have changed considerably. Cars have become more streamlined, and the old type sun visor has been completely eliminated. Also the front of the car body above the cowl, instead of being built perpendicular to the hood as in the past, now slopes toward the rear. This places the windshield at an angle and permits the entrance of the rays of the sun into the car while the sun is still comparatively high in the sky. This results in discomfort to the occupants of the front seat of the car both from the standpoint of heat and the effect of the rays on vision.

It is the chief object of my invention, therefore, to provide a sun visor which may be quickly and easily attached to the outside of the car to obviate the discomforts mentioned above.

Other objects are: to provide a sun visor which, although adapted to be mounted adjacent the windshield of the car, increases the wind resistance only very slightly when the car is traveling at high speed; and the angle of which may be adjusted from the inside of the car.

A further object of my invention is to provide a visor which not only has these special attributes, but which is also possessed of the usual attributes of simplicity, cheapness of manufacture, and reliability.

Figure 1:
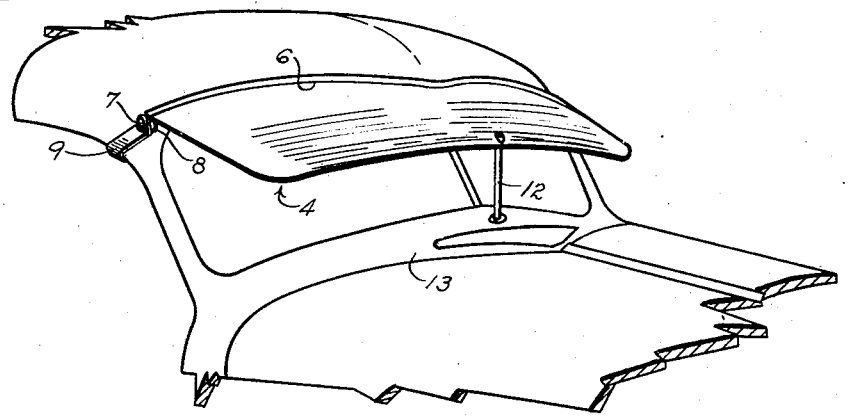
Figure 2:
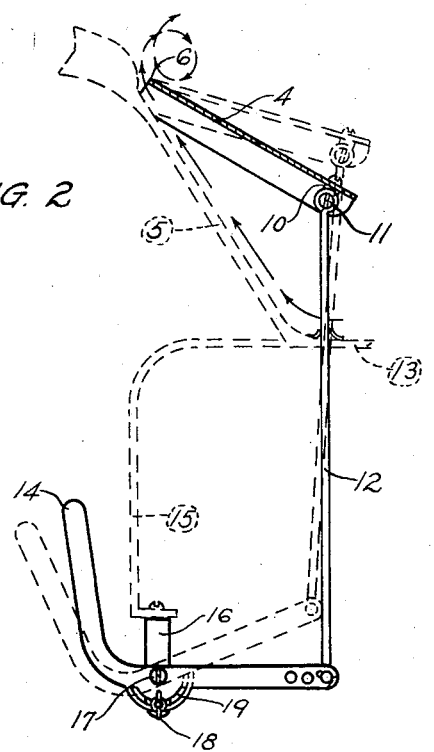
Figure 3:
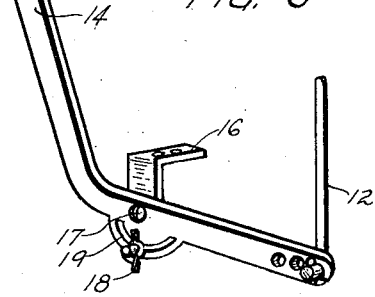

The details in the construction of a preferred form of my invention, together with other objects attending its production, will be better understood from the following description when read in connection with the accompanying drawing, which are chosen for illustrative purposes only, and in which, Figure 1 is a perspective view of the visor installed on a car;

Figure 2 is a transverse sectional view of the visor with the dash, cowl, and windshield of the car shown in dotted lines, and illustrating particularly the preferred means for adjusting the angle of the visor with relation to the car windshield; and, Figure 3 is a detailed perspective view of the adjusting lever and its supporting bracket.

Referring now to the details of construction of a preferred form of my invention, the visor proper which is designated as a whole by the numeral 4, may be made of any suitable material. I prefer, however, to make it of metal with rolled edges, along the front and two sides, and substantially in the concavo-convex shape as shown.

The visor is supported above the windshield 5 of a car in the manner shown, its rear edge 6 being spaced slightly away from the top of the car leaving an air passage between the rear edge of the visor and the car top. It is supported by pivot bolts 7 passing through pivot brackets 8 and through supporting brackets 9. These supporting brackets 9 are hook shaped at one end and of such length that when the pivot bolts 7 are tightened the hooked ends of the two oppositely positioned brackets are pulled toward each other and thus clamped tightly over the rim adjacent the car door.

As a means of adjusting the angle of the visor with relation to the car windshield, an L-shaped bracket 10 is secured near the front edge of the visor midway between its two side edges. This bracket 10 receives a pivot bolt 11 which serves as a pivot for the upper end of a tie rod 12 which passes through a suitable perforation in the cowl 13 of the car. The opposite end of this tie rod 12 is pivotally connected in the manner shown to the forward end of an adjusting lever 14. This lever 14 is pivotally supported from the dash 15 of the car by means of a supporting bracket 16. The lower end of the bracket 16 extends some distance below the pivot point 17 and carries a thumb adjusting nut and bolt 18. The bolt extends through the lower end of the bracket 16 and through an arcuate slot 19 formed in the lever 14. Thus the lever 14 may be moved to any desired position and the thumb nut 18 tightened to hold it in that particular position.

As shown by the dotted lines in Figure 2 the movement of the lever 14 moves the visor about its pivot points 7 to suit the requirements of the individual car driver. During travel of the car air currents follow the direction of the arrows as shown in Figure 2, pass along the windshield, upward, and through the slot between the rear edge of the visor and the forward end of the car. This air passage greatly reduces the wind resistance which would be present if the rear end of the visor was touching the front of the car. I contemplate forming the rear edge of the visor in various shapes to fit various model cars.

While I have described and illustrated a specific embodiment of my invention, I am aware that numerous alterations and changes may be made therein without changing the principle of the invention, and I do not wish to be limited except by the prior art and by the scope of the appended claim.

I claim:

A sun visor for automobiles having an inclined front windshield, said visor comprising: a longitudinally arched substantially rectangular shield made of semi-rigid material; a pair of brackets each having a substantially hook shaped outer end for hooking over a portion of the car body adjacent each upper corner of the windshield; threaded pivot pins and nuts for same at each rear corner of said shield, each adapted to co-operate respectively with one of said brackets to pivotally support the rear edge of said shield therebetween (in a position spaced away from the adjacent portion of the car), and to urge each of said brackets toward the other, for firmly positioning each bracket against its respective point of contact with the car body; a shield adjusting lever pivotally mounted inside the car; and a tie rod having one of its ends pivotally connected to one end of said lever and its other end pivotally connected adjacent the forward edge of said shield intermediate its ends, whereby as the lever is moved about its axis, the shield is moved about its point of pivot, thus changing its angular relation with the windshield without destroying the spaced relation between the rear edge of the shield and the adjacent portion of the car; and means for maintaining said lever in selected positions.

ERNEST R. SCOTT.